United States Patent [19]
Mizobuchi

[11] Patent Number: 5,996,391
[45] Date of Patent: Dec. 7, 1999

[54] METHOD OF FORMING A CORNER PORTION OF A TORQUE CONVERTER BY PRESS WORKING

[75] Inventor: Naoki Mizobuchi, Neyagawa, Japan

[73] Assignee: Exedy Corporation, Neyagawa, Japan

[21] Appl. No.: 09/050,092

[22] Filed: Mar. 30, 1998

[30] Foreign Application Priority Data

Mar. 31, 1997 [JP] Japan ..................................... 9-081257
Mar. 31, 1997 [JP] Japan ..................................... 9-081258

[51] Int. Cl.⁶ .................................................. B21D 22/30
[52] U.S. Cl. .......................................................... 72/348
[58] Field of Search .............................. 72/352, 348, 356

[56] References Cited

U.S. PATENT DOCUMENTS 2,120,595  6/1938  Ash ............................................ 72/352
2,966,873  1/1961  Hoffman et al. .......................... 72/466

FOREIGN PATENT DOCUMENTS 899 892     7/1949   Germany .
58-135732   8/1983   Japan ....................................... 72/348
2-175027    7/1990   Japan ....................................... 72/348
646264     11/1950   United Kingdom ..................... 72/348

*Primary Examiner*—Lowell A. Larson
*Attorney, Agent, or Firm*—Shinjyu An Intellectual Property Firm

[57] ABSTRACT

The present invention relates to a press working process whereby a front cover and an impeller shell are deformed such that corner portions are formed on a blank material whereby the corner portions undergo minimal reductions in thickness. In the press working method, compressive force is applied parallel to the thickness of the blank to circumvent reduction in thickness during the deforming process.

7 Claims, 6 Drawing Sheets

METHOD OF FORMING A CORNER PORTION OF A TORQUE CONVERTER BY PRESS WORKING

BACKGROUND OF THE INVENTION

A. Field of the Invention

The present invention relates to a method of forming a corner portion of a torque converter by a press working.

B. Description of the Background Art

A torque converter is a device which has three kinds of vane wheel members, an impeller, a turbine and a stator, which work together for transmitting a torque via movement of a working fluid. The impeller is fixed to a front cover coupled to a rotary member at an engine side, and transmits the torque to a transmission through the working fluid flowing from the impeller toward the turbine.

The front cover which is a component of the torque converter is formed by a press working in many cases. The front cover generally has a disk shape with a cylindrical shaped portion formed at a radial outer periphery thereof. The front cover is formed from a single plate material, pressed into the above described shape. An annular corner having a curved contour in cross-section is therefore formed between the disk shaped portion and the cylindrical shaped portion. The front cover 3 has a plate thickness of 4–6 mm, and the annular corner has a curvature radius nearly equal to the plate thickness.

An impeller shell of the impeller, which is another component of the torque converter, is formed by the press working in many cases. The impeller shell usually has a plate thickness of 3–5 mm and is provided at its radially inner portion with a curved portion having a curvature radius of 5–6 mm.

The press working which is performed on the front cover having the above form generally reduces the thickness of the radially outer curved portion. For suppressing this reduction in thickness, the front cover is usually formed stepwise, and more specifically a preliminary press working is effected before a finish press working. Under present circumstances, however, the thickness reduces 7% or more from the thickness of the blank material used to form these members. For avoiding reduction in strength due to the pressing operations, thick plates have been used as blanks in the prior art. Such a thick blank increases a production cost and weight of the subsequently produced torque converter.

In the impeller shell having the foregoing form and formed by a press working, a thickness is likewise reduced at the radially inner curved portion. More specifically, the thickness of the blank decreases at a rate from 5 to 20% when finished.

The impeller shell forms a working fluid chamber of the torque converter together with the front cover, and therefore is subjected to an internal pressure by the working fluid. If a thin portion is formed at the impeller shell, the torque converter may be deformed such that the dimension of the torque converter expand, which may result in disadvantages such as breakage and disengagement of parts. In order to avoid these disadvantages due to reduction in strength and rigidity caused by reduction in plate thickness, thick blanks have been employed in the prior art. However, such a thick blank increases a production cost as well as a weight of the torque converter.

SUMMARY OF THE INVENTION

One object of the invention is to form a corner in a portion of a torque converter by a method which suppresses reduction in plate thickness of the corner portion during the forming process in order to maintain a desired or required thickness thus maintaining a desired strength.

In accordance with one aspect of the present invention, a method for forming a corner portion of a torque converter member by press working a plate member includes several steps. First, a pre-shaped blank having a predetermined cross-section from a generally flat plate member is formed. The predetermined cross-section has a generally constant thickness. Next, finish press working is performed on the pre-shaped blank such that a portion of the pre-shaped blank is subjected to a compressive force parallel to local surfaces of dies proximate the portion thus forming a corner portion at the portion of the pre-shaped blank.

Preferably, the finish press working is such that the corner portion is formed at a radially outer portion of a front cover of a torque converter.

Preferably, the thickness of the corner portion is reduced by no more than 5% by the finish press working with respect to the thickness of the front cover.

Preferably, the finish press working is such that a radial outer portion of the front cover engages a surface 11a of a die 11, the surface 11a being parallel to an adjacent portion of the die 11, the surface 11a urging a portion of the front cover toward the corner portion to impart the compressive force to the pre-shaped blank.

Preferably, the finish press working is such that the radial outer portion of the front cover engages the surface 11a, the surface 11a being parallel to a thickness of the pre-shaped blank.

Preferably, the corner portion is formed at a radially inner portion of an impeller shell of a torque converter.

Preferably, the corner portion has a radius of no more than 6 mm and a thickness of the pre-shaped blank is reduced by less than 10%.

Preferably, the thickness of the corner portion of the pre-shaped bland is reduced by no more than 5% by the finish press working.

Preferably, the finish press working is such that a radial inner portion of the impeller shell engages a surface 61a of a die 61, the surface 61a being formed at an acute angle with respect to a portion of the impeller shell proximate the corner portion, the surface 61a configured to impart the compressive force to the impeller shell proximate the corner portion.

Preferably, the finish press working is such that a second radial inner portion of the impeller shell radially inward from the radial inner portion engages a surface 62a of a die 62, the surface 62a being formed at an acute angle with respect to a portion of the impeller shell proximate the corner portion, the surface 62a configured to impart the compressive force to the impeller shell proximate the corner portion opposing force from the surface 61a.

In the prior art, the approximate reduction in thickness of the corner portion is 15–20% for corner portions in a front cover. In contrast to the prior art, the forming method according to the present invention can attain a reduction in thickness of the corner portion of 5% or less, whereby a thinner plate can be used as the blank of the front cover.

In the forming method for producing a corner portion on an impeller shell having a radius of 6 mm or less in accordance with the present invention, the corner portion undergoes a thickness reduced by 10% or less compared to the thickness of the impeller shell blank before forming. In the prior art, the thickness of the corner portion is reduced 15–20% when measured under the similar conditions. In contrast to this, the forming method according to the present invention, the reduction rate can be 10% or less, which allows use of a thinner blank without sacrificing structural strength of the subsequently produced torque converter.

The foregoing and other objects, features, aspects and advantages of the present invention will become more apparent from the following detailed description, when taken in conjunction with the accompanying drawings.

DESCRIPTION OF THE PREFERRED EMBODIMENTS

First Embodiment

Figure 1:
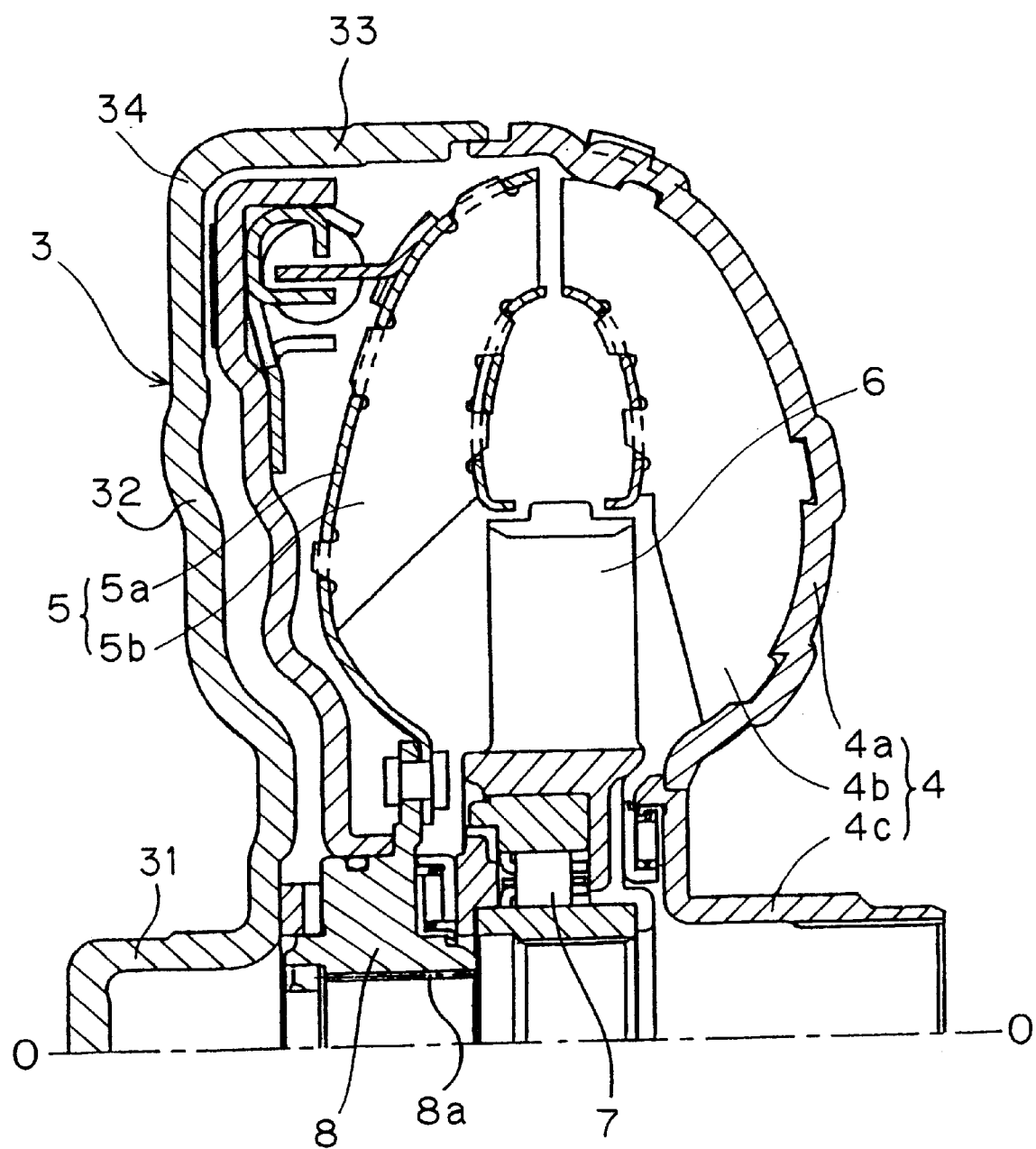
FIG. 1 is a schematic cross section of a torque converter including a front cover formed by a method in accordance with a first embodiment of the present invention.

FIG. 1 shows a torque converter 1 including a front cover 3 formed by a first embodiment of the present invention. In the figure, O—O represents a rotation axis of the torque converter 1, an engine (not shown) is arranged at the left in the figure, and a transmission (not shown) is arranged at the right in the figure.

The torque converter 1 is a mechanism for transmitting a torque from a crank shaft of the engine to a main drive shaft of the transmission. The torque converter 1 is basically formed with a front cover 3 that is configured for coupling to the crank shaft of the engine through a flexible plate, an impeller 4, a turbine 5 and a stator 6. The front cover 3 and an impeller shell 4a of the impeller 4 are welded together at their outer peripheral portions to form a working fluid chamber between them.

The front cover 3 is formed of a circular plate-like main portion 32, a boss 31 and an outer peripheral connection portion 33, and is provided with a radially outer corner portion 34 between the main portion 32 and the outer peripheral connection portion 33. The boss 31 is formed radially inside the main portion 32 for positioning and centering the front cover 3 with respect to parts at the engine side. The outer peripheral connection portion 33 having a cylindrical form is formed radially outside the main portion 32, and is fixed to the outer peripheral portion of an impeller shell 4a at its end near the transmission. A method of forming the radially outer corner portion 34 of the front cover 3 is described below.

The impeller 4 is formed of the impeller shell 4a, a plurality of impeller blades 4b fixed to the inner surface of the impeller shell 4a, and an impeller hub 4c fixed to the inner periphery of the impeller shell 4a.

The turbine 5 is opposed to the main portion 41 of the impeller shell 4a with the working fluid chamber therebetween, and is basically formed of a turbine shell 5a and a plurality of turbine blades 5b fixed to the turbine shell 5a. A turbine hub 8 having a spline aperture 8a for coupling to the main drive shaft, which extends from the transmission, is fixed to the inner periphery of the turbine shell 5a.

The stator 6 is arranged between the impeller 4 and the turbine 5, and is fixed to a stator shaft, which is fixed to a housing of the transmission, through a one-way clutch 7.

Operation of the torque converter 1 is described below.

Torque transmitted from the crank shaft of the engine is supplied to the front cover 3 through a flexible plate (not shown). The torque is transmitted to the impeller shell 4a via the front cover 3. Thereby, the impeller 4 rotates, and the working fluid flows from the impeller shell 4a toward the turbine 5. The flowing working fluid rotates the turbine 5 so that the torque of the turbine 5 is output to the main drive shaft through the turbine hub 8.

Description is now given on the method of forming the radially outer corner portion 34 of the front cover 3.

Figure 2:
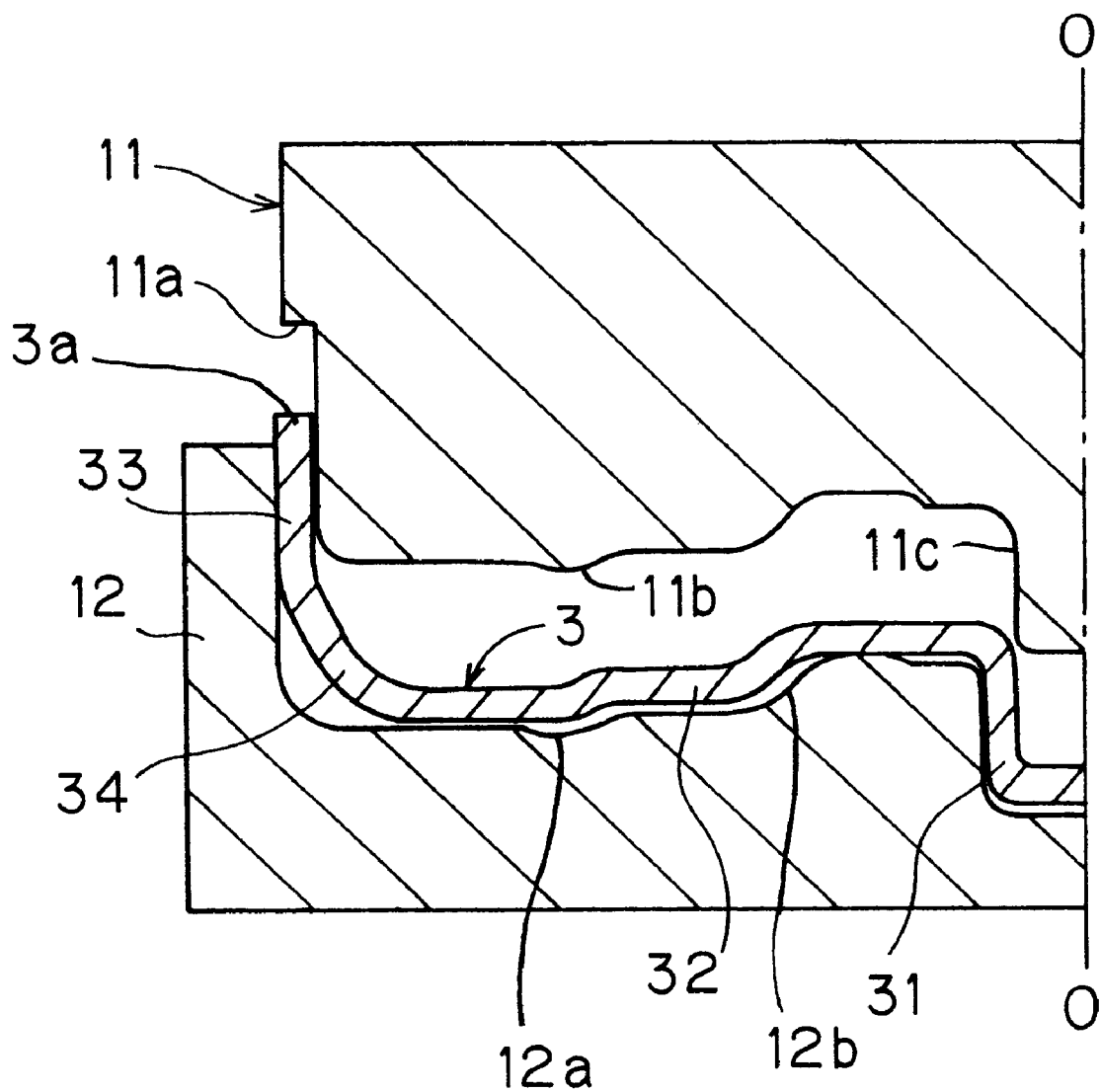
FIGS. 2 and 3 are cross sections of dies and material used to form the front cover depicted in FIG. 1.

First, a circular steel plate is prepared by cutting a blank flat plate into a predetermined configuration. The steel plate is then subjected to a preliminarily pressing process to form the front cover 3 having a general form shown in FIG. 2. It should be understood that the form depicted in FIG. 2 is that of an annular member shown only in cross section. The preliminary pressing process may be any of a number of pressing step, well know in the art, for attaining the shape depicted in FIG. 2. Typically at least one pressing step is required in order to attain the shape depicted in FIG. 2, although, two or more steps may be necessary.

Figure 3:
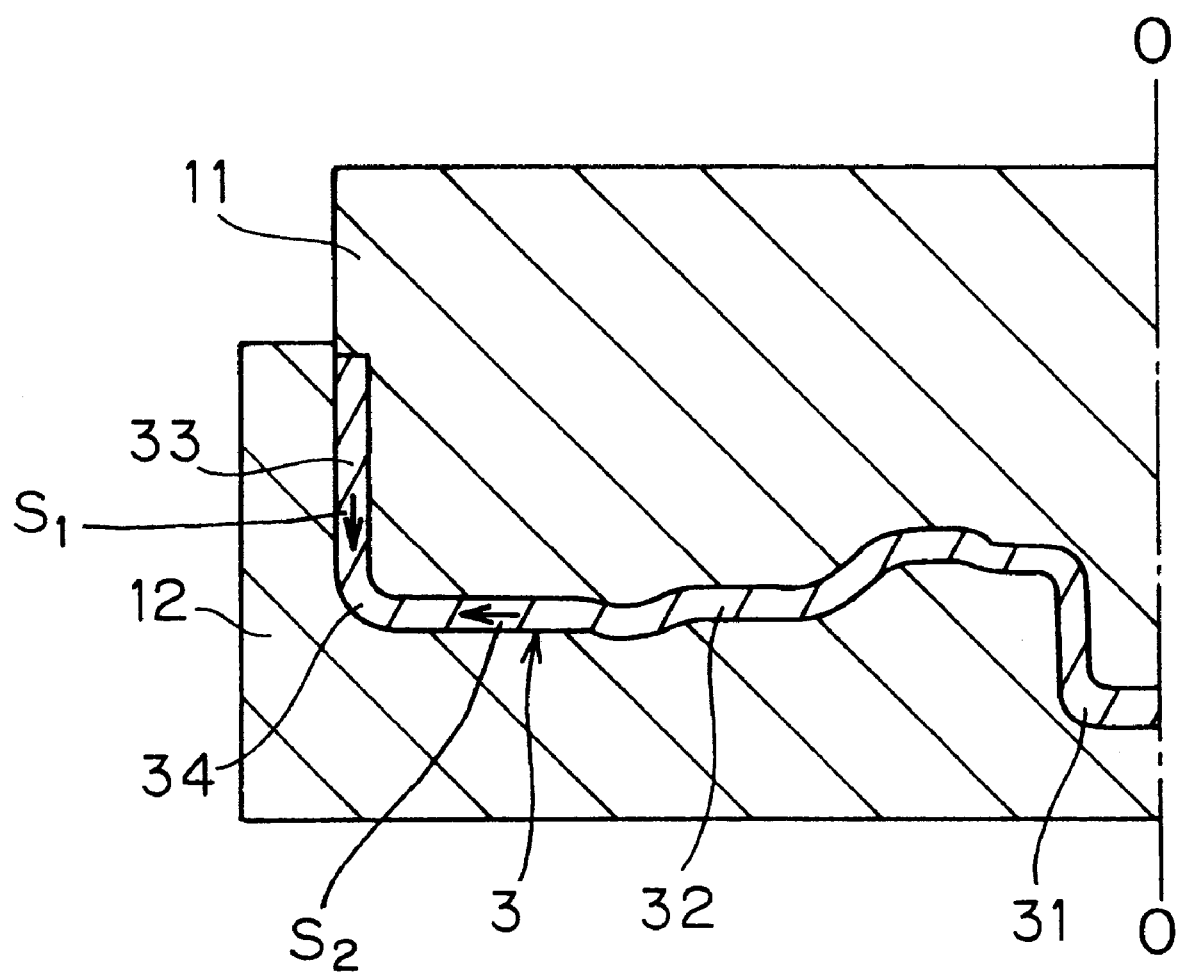

Thereafter, a finish pressing process is performed with dies 11 and 12 shown in FIGS. 2 and 3. More specifically, the die 11 is pressed downward against the unfinished impeller shell 4a, with the unfinished impeller shell 4a resting on the die 12 as shown in FIG. 2. In the finish pressing process, a surface 11a of the die 11 pushes downward a free end 3a of the outer peripheral connection portion 33 of the front cover 3 remote from the radially outer corner portion 34. At the same time, the unfinished impeller shell 4a is confined between the surfaces 11b, 11c, 12a and 12b of the dies 11 and 12. Thus, internal compressive stresses act on the outer peripheral connection portion 33 and the radially outer corner portion 34 in a direction parallel to the direction of the thickness as indicated by an arrows $S_1$ and $S_2$ in FIG. 3. This suppresses reduction in thickness, which is often caused by extension of the radially outer corner portion 34. In some cases, the internal compressive stresses increase the thickness of the corner portion 34 owing to compression. Therefore, the radially outer corner portion 34, which is finished by the press working as shown in FIG. 3, has a lager thickness than the prior art. Accordingly, the required thickness of the blank can be reduced compared to prior art configuration while maintaining a strength, and the production cost can be reduced.

In the prior art, the finish press working is performed without applying a compressive force to the radially outer corner portion 34. In this case, the finish press working reduces the thickness of the blank from 5.00 mm to a value from 4.40 to 4.55 mm, and thus the thickness decreases about 9%. In contrast to this, according to the method of this embodiment, the press working changes the thickness of the blank from 5.00 mm into a value of 4.95–5.10 mm, and thus the thickness does not substantially decrease.

Second Embodiment

Figure 4:
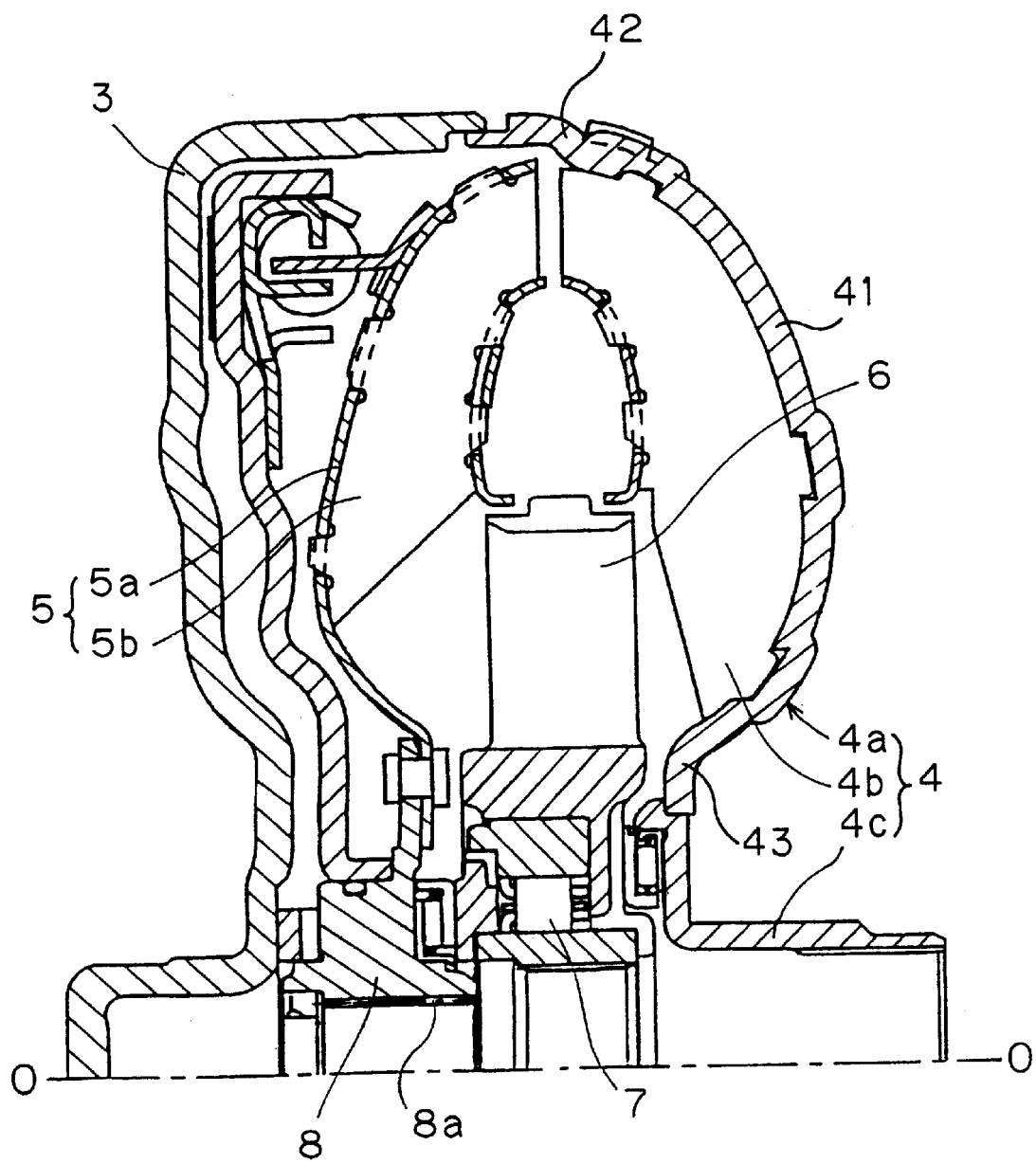
FIG. 4 is a schematic cross section of a torque converter including an impeller shell formed by a method in accordance with a second embodiment of the present invention.

FIG. 4 shows the torque converter 1 including an impeller shell 4a formed by a second embodiment of the invention. In FIG. 4, O—O represents the rotation axis of the torque converter 1, the engine (not shown) is arranged at the left in the figure, and the transmission (not shown) is arranged at the right in the figure.

The torque converter 1 is a mechanism for transmitting a torque from the crank shaft of the engine to the main drive shaft of the transmission, and is basically formed of the front cover 3 coupled to the crank shaft of the engine through the flexible plate, the impeller 4 including the impeller shell 4*a*, the turbine 5 and the stator 6. The front cover 3 and the impeller shell 4*a* of the impeller 4 are welded together at their outer peripheral portions to form the working fluid chamber between them.

The impeller 4 is formed of the impeller shell 4*a*, the plurality of impeller blades 4*b* fixed to the inner surface of the impeller shell 4*a*, and the impeller hub 4*c* fixed to the inner periphery of the impeller shell 4*a*.

The impeller shell 4*a* is formed of the main portion 41, an outer peripheral connection portion 42 and a radially inner corner portion 43. The main portion 41 is opposed to the turbine 5. The radially outer corner portion 42 is formed radially outside the main portion 41, and is fixed to the front cover 3. The radially inner corner portion 43 is formed radially inside the main portion 41, and is fixed to the impeller hub 4*c*. A method of forming the radially inner corner portion 43 of the impeller shell 4*a* is described below.

The turbine 5 is opposed to the main portion 41 of the impeller shell 4*a* with the working fluid chamber therebetween, and is basically formed of the turbine shell 5*a* and the plurality of turbine blades 5*b* fixed to the turbine shell 5*a*. The turbine hub 8 having the spline aperture 8*a* for coupling to the main drive shaft, which extends from the transmission, is fixed to the inner periphery of the turbine shell 5*a*.

The stator 6 is arranged between the impeller 4 and the turbine 5, and is fixed to the stator shaft, which is fixed to the housing of the transmission, through the one-way clutch 7.

An operation of the torque converter 1 will be described below.

The torque sent from the crank shaft of the engine is supplied to the front cover 3 through the unillustrated flexible plate. The torque is transmitted to the impeller shell 4*a*. Thereby, the impeller 4 rotates, and the working fluid flows from the impeller shell 4*a* toward the turbine 5. The flowing working fluid rotates the turbine 5 so that the torque of the turbine 5 is output to the main drive shaft through the turbine hub 8.

Description is now given on the method of forming the radially inner corner portion 43 of the impeller shell 4*a*.

Figure 5:
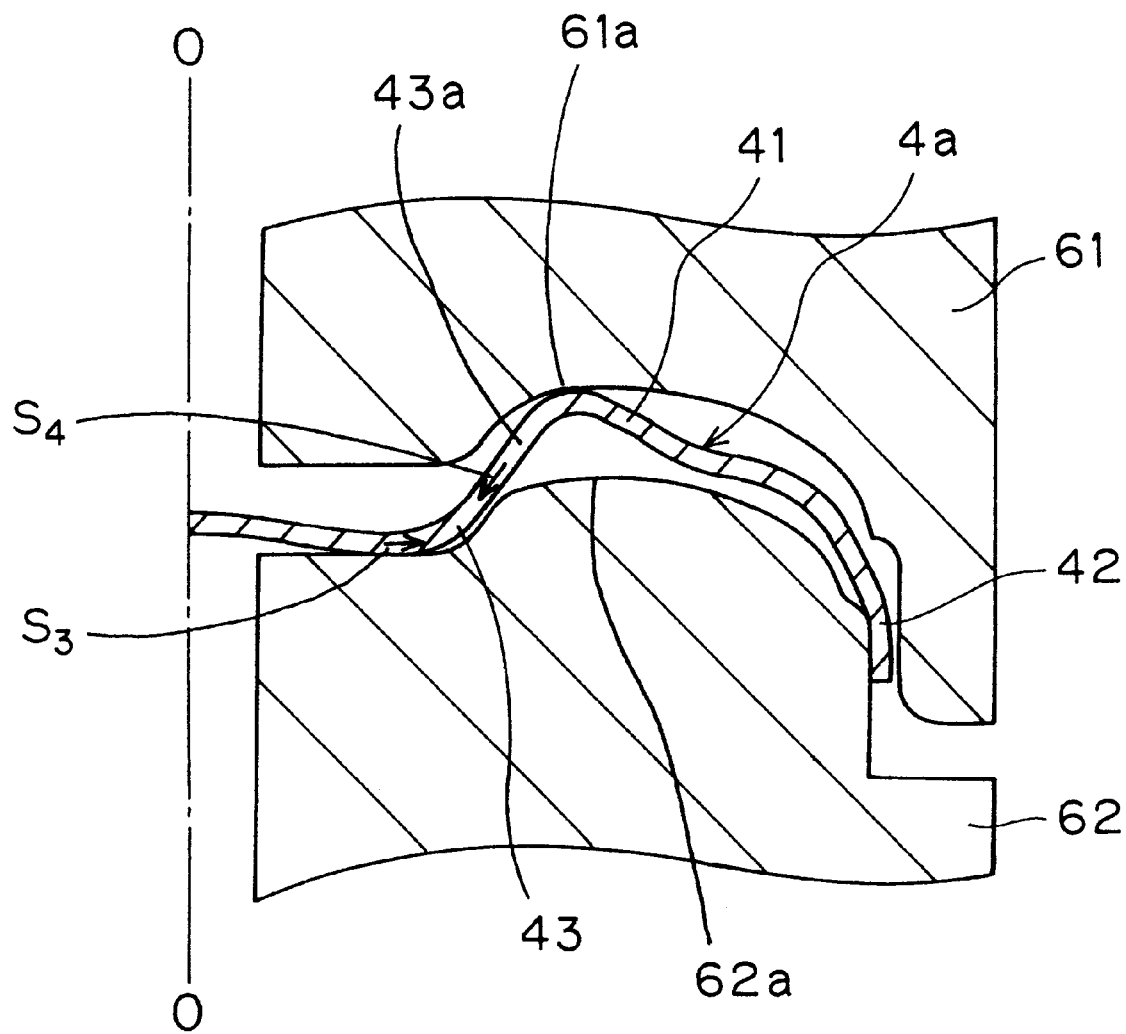
FIGS. 5 and 6 are cross sections of dies and a material used to form the impeller shell depicted in FIG. 4.

First, a circular steel plate, which was prepared by cutting a blank plate, is preliminarily pressed to form the impeller shell 4*a* having a cross section form shown in FIG. 5.

Figure 6:
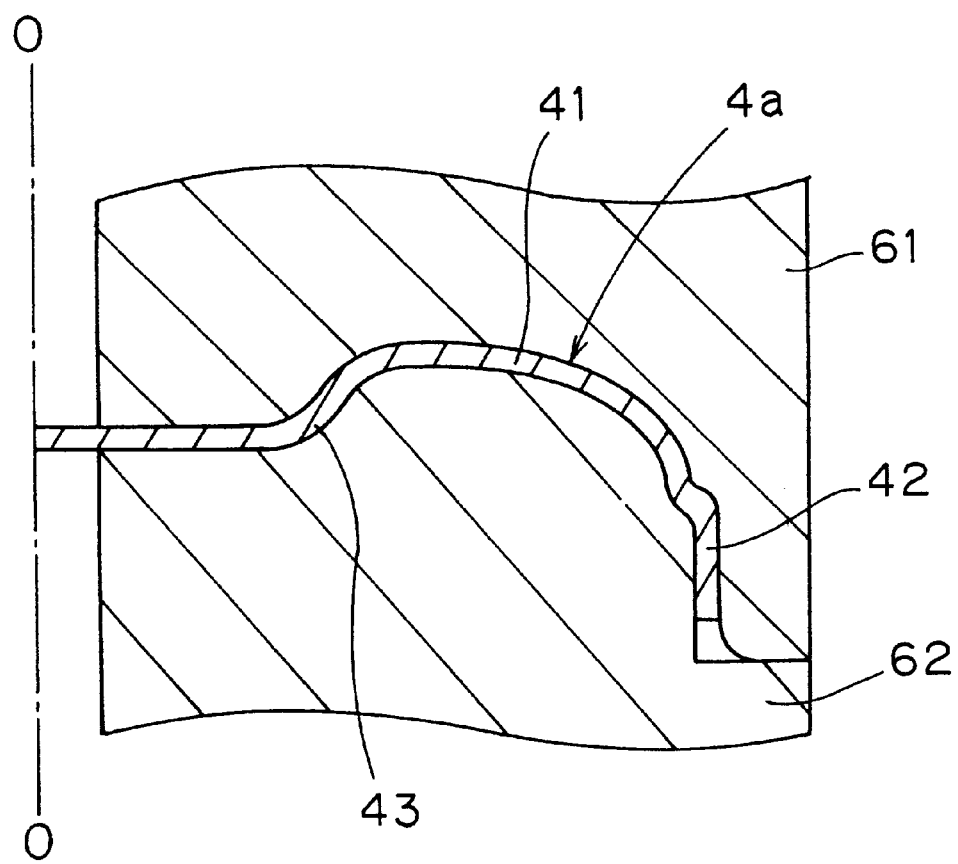

Next, finish press working is performed with dies 61 and 62 shown in FIGS. 5 and 6. More specifically, the die 61 is pressed downward again the impeller shell 4*a* laid on the die 62 as shown in FIG. 5. In this finishing work, the radially inner corner portion 43 and a portion 43*a* are compressed in a direction parallel to the direction of thickness of the impeller shell 4*a* by the force indicated by arrows $S_3$ and $S_4$ in FIG. 5 while the impeller shell 4*a* is being pressed. Thereby, the finish press working shown in FIG. 6 does not significantly reduce the thickness of the radially inner corner portion 43. Therefore, the required thickness of blank of the impeller shell 4*a* can be small so that the weight of the torque converter 1 can be reduced while maintaining a strength and a rigidity of the impeller shell 4*a*.

In the prior art, the finish press working is performed without applying a compressive force to the radially inner corner portion 43. In this case, the bending press working for forming a corner of 5 mm in radius reduces the thickness of the blank from 3.850 mm to 3.11 mm, and therefore the thickness decreases about 19%. In contrast to this, according to the method of the present invention, the press working for forming a corner of 5 mm in radius reduces the thickness of the blank from 3.85 mm to 3.57 mm, and therefore the thickness decreases only about 7%. Also, according to the method of this embodiment, the bending press working for forming a corner of 5.5 mm in radius reduces the thickness of the blank from 3.85 mm to 3.76 mm, and therefore the thickness decreases only about 2%. The above numbers and percentages relating to the present invention were derived from tests conducted using the methods and die configurations of the present invention.

According to the invention, the compressive force in the direction crossing the direction of thickness of the blank is applied to the corner portion during the finish press working so that the reduction in thickness of the corner portion can be suppressed. Accordingly, the thickness of the finish-pressed corner portion can be larger than that in the prior art so that the required thickness of the blank can be reduced while maintaining the strength, and therefore the production cost can be reduced.

Also, according another aspect of the invention, the first step is performed prior to the finish press working in the second step. In this first step, the blank is shaped such that the compressive force in the direction crossing the direction of thickness of the blank will be applied to the corner portion during the finish press working. This suppresses reduction in thickness of the corner portion which may be caused by the finish press working in the second step. Accordingly, the required thickness of the blank can be reduced as compared with the prior art, while maintaining the strength and rigidity of the corner portion, and therefore the production cost and the weight can be reduced.

It should be appreciated that in FIGS. 2, 3, 5 and 6 the depicted members are shown in cross section and as such, only half of the cross section is depicted. The line 0—0 is a centerline about which there is symmetry of the front cover and impeller shell.

Various details of the present invention may be changed without departing from its spirit or its scope. Furthermore, the foregoing description of the embodiments according to the present invention are provided for illustration only, and not for the purpose of limiting the invention as defined by the appended claims and their equivalents.

What is claimed is:

1. A method for forming a corner portion of a torque converter member by press working a plate member, the method comprising the steps of:

forming a pre-shaped blank having a generally disk shaped portion, an annular lip formed on a radial outer portion of the disk shaped portion and the corner portion formed between the annular lip and the disk shaped portion, the corner portion having a first radius when viewed in cross-section, the pre-shaped blank further having a predetermined cross-section and being formed from a generally flat plate member, the predetermined cross-section having a generally constant thickness;

positioning the pre-shaped blank between a first die and and second die, the first die having an outer diameter that generally coincides with an inner diameter of the second die, the first die being insertable into the second die;

finish press working the pre-shaped blank such that generally all of a first surface of the pre-shaped blank and a corresponding inner radial surface of the annular lip engage a corresponding surface of the first die, and generally all of a second surface of the pre-shaped blank and a corresponding outer radial surface of the annular lip engage a corresponding surface of the second die as the pre-shaped blank is subjected to a compressive force parallel to local surfaces of the first and second die and an edge of the annular lip engages a corresponding surface of the first die such that the corner portion is deformed to provide a second radius of curvature when viewed in cross-section that is several times smaller than the first radius; and wherein the thickness of said corner portion is reduced by no more than 5% by said finish press working with respect to the thickness of said front cover.

2. The method according to claim 1, wherein said finish press working is such that the corner portion is formed at a radially outer portion of a front cover of a torque converter.

3. The method according to claim 1, wherein said finish press working is such that the edge of the annular lip of the front cover engages a surface 11*a* of the first die 11, the surface 11*a* being perpenducularl to an adjacent portion of the die 11, the surface 11*a* urging a portion of the front cover toward the corner portion to impart the compressive force to the pre-shaped blank.

4. A method for forming a corner portion of a torque converter member by press working a plate member, the method comprising the steps of:

forming a pre-shaped blank having a generally disk shaped portion, an annular lip formed on a radial outer portion of the disk shaped portion and the corner portion formed between the annular lip and the disk shaped portion, the corner portion having a first radius when viewed in cross-section, the pre-shaped blank further having a predetermined cross-section and being formed from a generally flat plate member, the predetermined cross-section having a generally constant thickness;

positioning the pre-shaped blank between a first die and and second die, the first die having an outer diameter that generally coincides with an inner diameter of the second die, the first die being insertable into the second die; and finish press working the pre-shaped blank such that a portion of a first surface of the pre-shaped blank except a center portion and an inner radial surface of the annular lip engage an adjacent surface of the first die, and generally all of a second surface of the pre-shaped blank except a central portion thereof and an outer radial surface of the annular lip engage an adjacent surface of the second die as the pre-shaped blank is subjected to a compressive force parallel to local surfaces of the first and second die and the annular lip engages an adjacent surface of the first die such that the corner portion is deformed to provide a second radius of curvature when viewed in cross-section that is several times smaller than the first radius, and wherein the corner portion is formed at a radially inner portion of an impeller shell of a torque converter the corner portion has a radius of no more than 6 mm and a thickness of the pre-shaped blank is reduced by less than 10%.

5. The method according to claim 4, wherein the thickness of the corner portion of the pre-shaped blank is reduced by no more than 5% by said finish press working.

6. The method according to claim 4, wherein said finish press working is such that a radial inner portion of the impeller shell engages a surface 61*a* of a die 61, the surface 61*a* being formed at an acute angle with respect to a portion of the impeller shell proximate the corner portion, the surface 61*a* configured to impart the compressive force to the impeller shell proximate the corner portion.

7. The method according to claim 6, wherein said finish press working is such that a second radial inner portion of the impeller shell radially inward from the radial inner portion engages a surface 62*a* of a die 62, the surface 62*a* being formed at an acute angle with respect to a portion of the impeller shell proximate the corner portion, the surface 62*a* configured to impart the compressive force to the impeller shell proximate the corner portion opposing force from the surface 61*a*.

* * * * *